US007213631B1

(12) United States Patent
Brewer et al.

(10) Patent No.: US 7,213,631 B1
(45) Date of Patent: May 8, 2007

(54) DEVICE FOR APPLYING A HORIZONTAL PAPER BORDER ON A WALL

(76) Inventors: Robert F. Brewer, 14171 Poplar, Southgate, MI (US) 48195; Aaron T Bunch, 11500 Morningview Dr., Southgate, MI (US) 48195

( * ) Notice: Subject to any disclaimer, the term of this patent is extended or adjusted under 35 U.S.C. 154(b) by 266 days.

(21) Appl. No.: 10/879,453

(22) Filed: Jun. 30, 2004

(51) Int. Cl.
*B32B 37/00* (2006.01)
*B32B 39/00* (2006.01)
*B44C 7/06* (2006.01)

(52) U.S. Cl. ...................... 156/523; 156/524; 156/574; 156/576; 156/579

(58) Field of Classification Search .................. 156/71, 156/576–579, 574, 523, 524
See application file for complete search history.

(56) References Cited

U.S. PATENT DOCUMENTS 471,636 A 3/1892 Graham
701,727 A 6/1902 Holmes
5,328,543 A 7/1994 Campagna
5,403,430 A 4/1995 Araujo et al.
5,725,727 A * 3/1998 Tutewohl .................... 156/579

FOREIGN PATENT DOCUMENTS

DE 20112914 U1 * 12/2001
GB 2267871 A * 12/1993

OTHER PUBLICATIONS

English Abstract of DE 20,112,914.*
Webster's II New Riverside University Dictionary, The Riverside Publishing Company, 1994.*

* cited by examiner

*Primary Examiner*—Chris Fiorilla
*Assistant Examiner*—Sing P. Chan
(74) *Attorney, Agent, or Firm*—Charles W. Chandler; Steve M. Clemmons

(57) ABSTRACT

A border guide and method for applying an elongated strip of border paper in a horizontal position on a vertical wall. The paper is soaked in water to activate the adhesive and then wound on a roll on the border guide. The user then presses one end of the border guide to the wall and unrolls the roll of paper as he removes the handle in a horizontal position. A squeegee presses the paper to the wall as it is being unwound.

4 Claims, 3 Drawing Sheets

DEVICE FOR APPLYING A HORIZONTAL PAPER BORDER ON A WALL

BACKGROUND OF THE INVENTION

This invention is related to a method and a device for attaching a paper border on a vertical wall. One of the problems with attaching a paper border on a wall is that normally the entire length of paper is soaked in water to activate the adhesive. The paper border which may be several feet long must then be held by one person so that the different sections of the paper do not contact one another while the adhesive is wet. A second person then progressively presses the paper border to the wall in a horizontal motion. This is a time-consuming process and may take an hour or so to apply a single strip of paper.

This problem has been addressed in the prior art. See for example U.S. Pat. No. 5,328,543, issued Jul. 12, 1994, to Thomas G. Campagna for "Border Guide". This patent discloses a housing mounted on the upper end of a long pole. The pole supports the paper and the housing at a height that generally corresponds to the height to which the paper is being attached.

U.S. Pat. No. 701,727 which was issued Jun. 3, 1902, to Cuthbert Holmes for "Paper Hanging Machine" shows another device for applying wallpaper to a wall. This device mounts the paper on a roller and includes a brush which presses the paper firmly in place. This device can also be used for applying borders. This arrangement of the roller with respect to the handle suggests that the paper is pressed against the wall by the user. The brush applies additional pressure to complete the operation.

U.S. Pat. No. 5,403,430 issued Apr. 4, 1995 to Araujo et al. shows a border roller applicator. Araujo uses a first roller for holding the paper, and a wiper 12 that removes excess water and paste from the unwinding paper as the paper is pressed against the wall by a second roller 16. His wiper does not apply direct pressure on the paper.

U.S. Pat. No. 471,636 issued to E. M. Graham, shows a paper-hanging machine employing two rollers and a strip E for pressing paper on the wall.

SUMMARY OF THE INVENTION

The broad purpose of the present invention is to provide an improved border guide and method for applying an elongated strip of border paper on a wall. The preferred embodiment of the invention, which will be described in greater detail, employs a body having a handle and a single roller mounted along an axis that is at right angles to the axis of the handle.

A squeegee is mounted parallel to the roller on the opposite side of the handle. The axis of the handle, the roller and the squeegee all lay in a common plane. A disc-like seat is mounted on the roller. A fastener connects the seat to the roller at a position adjusted according to the length of the roller.

The paper is initially wetted in the conventional manner such as by soaking it in a container of water. The paper is then quickly wound on the roller while the adhesive is still wet. The user then supports the roll of paper in a vertical position and presses the leading edge of the paper to the wall. He then uses the squeegee to press down on the paper. By moving his hand horizontally, he unwinds the roll of paper as he progressively advances the border paper along the wall.

The border paper can be easily mounted by a single person in a job that can be completed in a matter of minutes, compared to over an hour in some cases when conventional methods are used.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views; and in which.

DESCRIPTION OF THE PREFERRED EMBODIMENT

Figure 1:
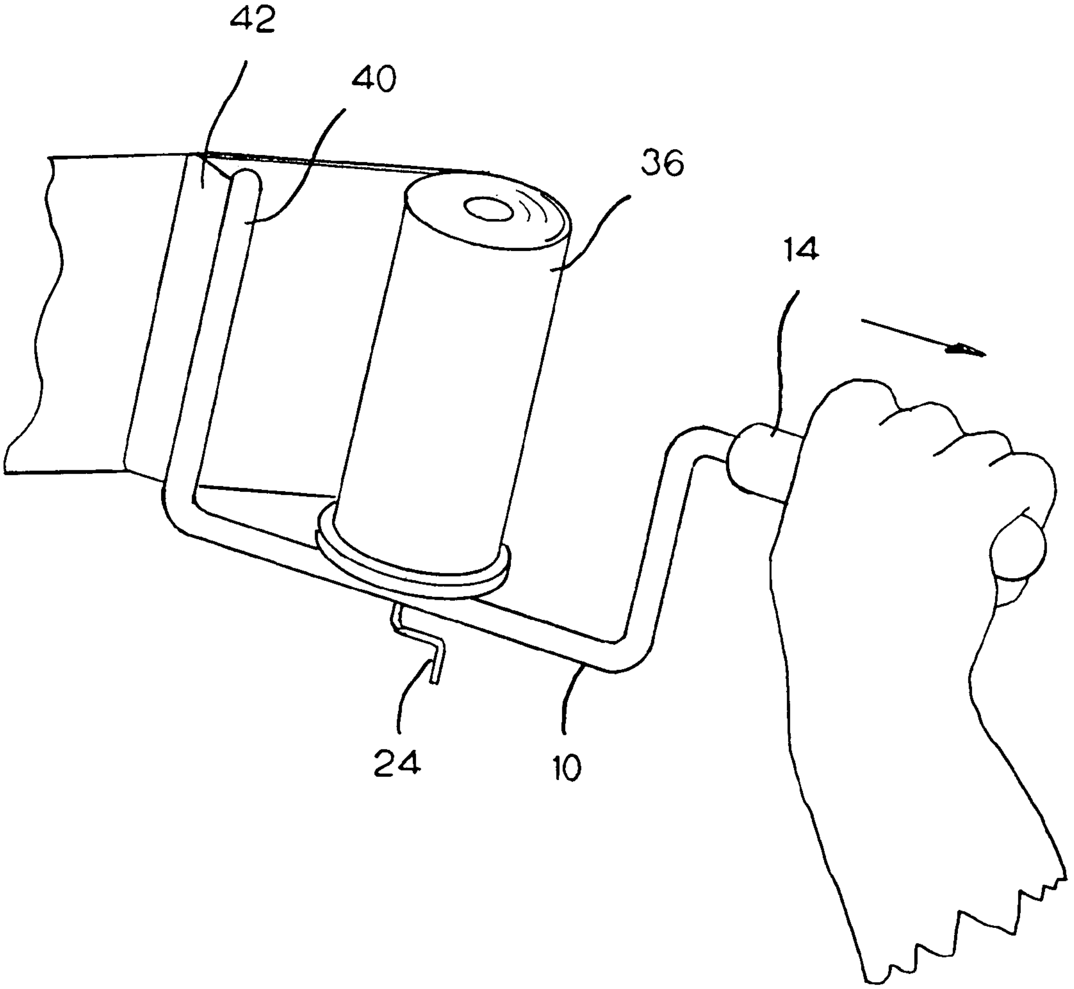
FIG. 1 illustrates a preferred border guide being used to apply border paper to a vertical wall.

Referring to the drawings, a preferred border guide 10 comprises a body 12 preferably having an integral handle 14. For illustrative purposes, the length of handle 14 is about 5½". The body includes an arm 16 which is at right angles to the axis 18 of the handle, and a second arm supported along an axis 22 that is parallel to arm 16 and also at right angles to the axis 18 of the handle and lying in the same plane as axis 18. Arm 20 is about 2½" from arm 16.

A crank 24 is mounted on the body and attached to a shaft 26 which extends through the longitudinal center of arm 20. The shaft is rotatable in the arm by rotating crank handle 28.

A sleeve 30 (roller) is slidably mounted on arm 20 and has a length greater than arm 16. The outer end of shaft 26 is frictionally connected to sleeve 30 so that by rotating the crank handle, the sleeve is rotated. A disc-like seat 32 is mounted on arm 20. A threaded fastener 34, mounted on the seat, engages arm 20, to lock the seat in an adjusted position along the length of arm 20. The sleeve is frictionally connected to the outer end of shaft 26 so that the sleeve can be mounted in an adjusted position along the length of arm 20 to accommodate the location of the width of border paper 36.

A third arm 40 is carried by body 12, and supported parallel to arm 20 a sufficient distance from arm 20 to provide clearance for a rolled up strip of paper. An elongated squeegee 42 preferably formed of a relatively rigid plastic material is carried along the outer edge of arm 40. The squeegee is about 6" in length. The overall length of arm 40 is about 6½". The squeegee lies in a plane containing the axis of sleeve 30 and the axis of handle 14. The squeegee could also be formed of a somewhat resilient material. The squeegee preferably has a width of about ⅞" a thickness of ⅛", and a length of about 6".

In use, the position of the roller sleeve is adjusted to support the roll of paper in a position centrally located with respect to the length of the squeegee. Fastener 34 then locks seat 32 on arm 20. Sleeve 30 is then rotatable on arm 20.

Figure 2:
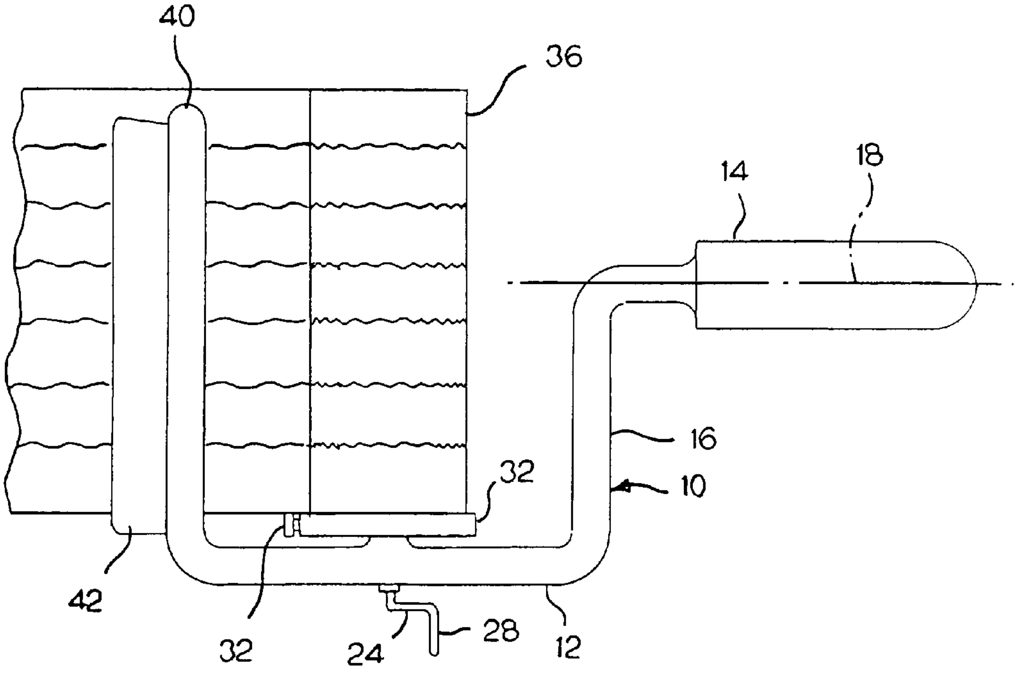
FIG. 2 is a view of the border guide in a direction at right angles to the axis of the roll of paper.
Figure 3:
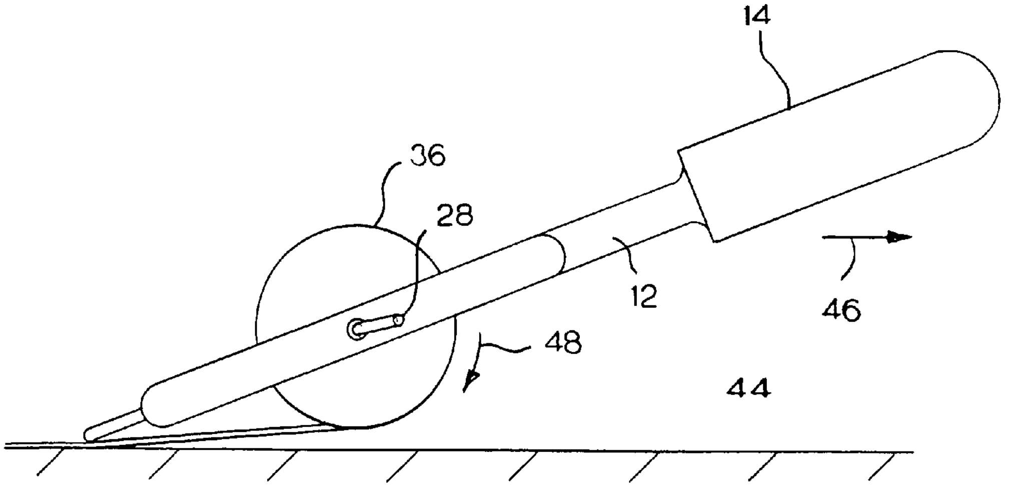
FIG. 3 is a view as seen from the side of FIG. 2.
Figure 4:
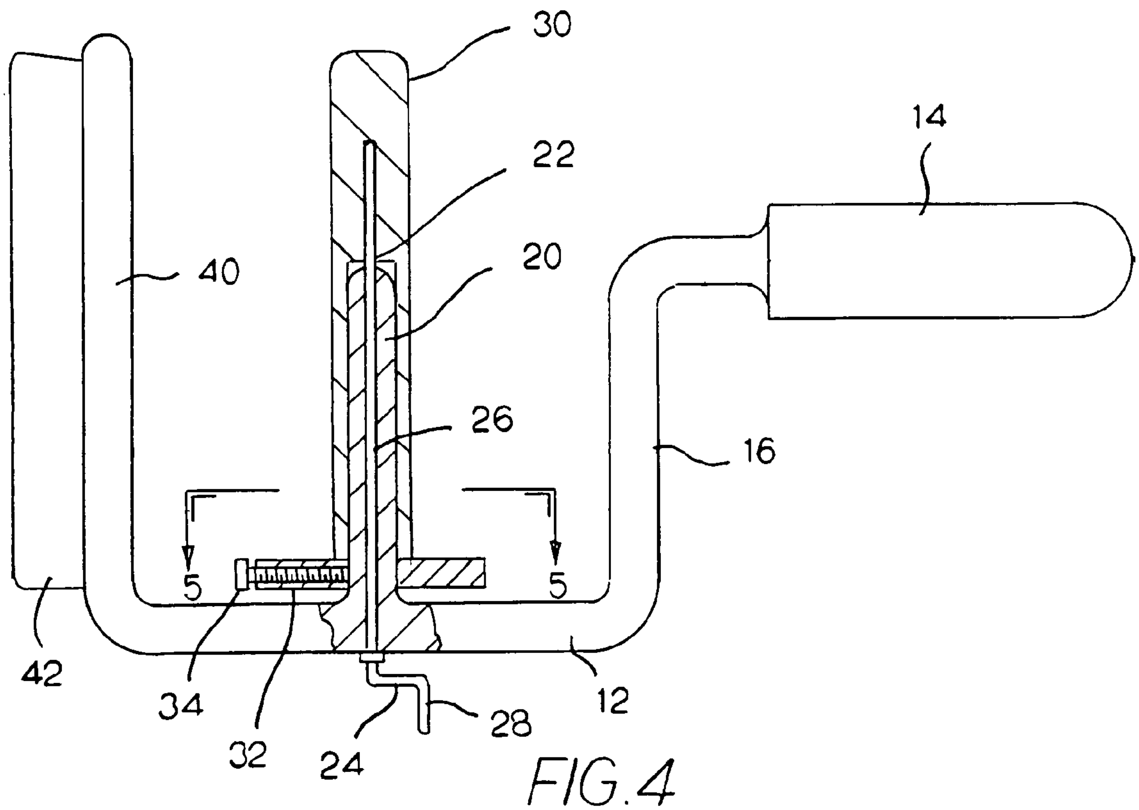
FIG. 4 is a fragmentary view of the border guide.
Figure 5:
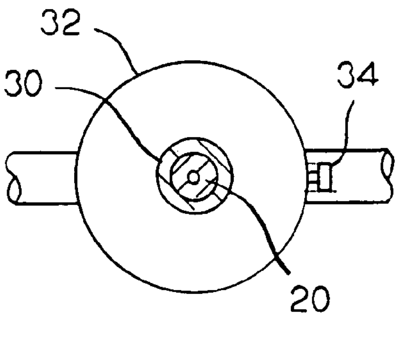
FIG. 5 is a view generally as seen along lines 5—5 of FIG. 4.

The user soaks the paper border in water in the conventional manner, and then rolls up the paper on the sleeve as illustrated in FIGS. 1 and 2 by rotating crank handle 28. This is done in a relatively rapid manner so that the job can be completed before the adhesive has set. The outer end of the paper roll extends beyond squeegee 42 as illustrated in FIG. 3 and then is pressed to a vertical wall 44. The user applies pressure with his hand so the squeegee applies a pressure on the paper toward the wall. He then advances the device in a horizontal direction, illustrated in the direction of arrow 46, as the paper is unwound in the direction of arrow 48, as shown in FIG. 3. He quickly advances the device in a horizontal motion, unwinding and pressing the paper toward the wall until the entire strip has been unwound and applied to the wall. The process is rapid, efficient, and requires only the use of a single user.

We claim:

1. A device for applying a paper border on a wall comprising:

a body, including a handle having a first axis, and an elongated arm;

a single sleeve mounted concentrically around the arm for rotation about a second axis generally at right angles to the first axis, the handle being spaced a distance from the sleeve a distance greater than the diameter of a roll of paper mounted on the sleeve;

a second handle having a shaft extending through a longitudinal center of the arm and connected to the sleeve for turning same to wind up an elongated strip of a paper border;

an elongated squeegee mounted on the body in a spaced parallel relationship with respect to the sleeve and disposed on the opposite side of the sleeve as the handle; the axis of the handle, the axis of the sleeve and the squeegee being disposed substantially in a common plane; and the sleeve being frictionally, rotatably slidably mounted on the arm in a direction parallel to the squeegee; and a seat mounted on the arm so as to be slidable along said arm to an adjusted position accommodating the width of a roll of paper mounted on the sleeve, such that both side edges of the paper are centrally located with respect to the ends of the squeegee.

2. A device for applying a paper border on a wall as defined in claim 1, in which the squeegee is formed of a relatively rigid material and has a length accommodating the width of a roll.

3. A device for applying a paper border on a wall as defined in claim 1, in which the arm is a first arm, and in which the body includes a second arm that is parallel to the first arm, wherein the squeegee is generally flat and extends from an outer edge of the second arm.

4. A device for applying a paper border on a wall as defined in claim 3, in which the squeegee includes an outer-most trailing edge that is co-planar with the axis of the handle and the axis of the sleeve.

* * * * *